United States Patent
Fang et al.

(10) Patent No.: US 12,200,655 B2
(45) Date of Patent: *Jan. 14, 2025

(54) GEOLOCATIONING SYSTEM AND METHOD FOR USE OF SAME

(71) Applicant: Enseo, LLC, Plano, TX (US)

(72) Inventors: William C. Fang, Plano, TX (US); Raymond S. Horton, McKinney, TX (US); Thomas R. Miller, Plano, TX (US)

(73) Assignee: Enseo, LLC, Plano, TX (US)

( * ) Notice: Subject to any disclaimer, the term of this patent is extended or adjusted under 35 U.S.C. 154(b) by 406 days.

This patent is subject to a terminal disclaimer.

(21) Appl. No.: 17/671,544

(22) Filed: Feb. 14, 2022

(65) Prior Publication Data

US 2022/0174642 A1   Jun. 2, 2022

Related U.S. Application Data

(63) Continuation-in-part of application No. 17/154,713, filed on Jan. 21, 2021, now Pat. No. 11,343,543, and a continuation of application No. 16/881,890, filed on May 22, 2020, now abandoned, said application No. 17/154,713 is a continuation of application No.
(Continued)

(51) Int. Cl.
| | |
|---|---|
| *H04W 64/00* | (2009.01) |
| *H04B 17/318* | (2015.01) |
| *H04B 17/391* | (2015.01) |
| *H04W 4/02* | (2018.01) |

(Continued)

(52) U.S. Cl.
CPC .......... *H04W 64/00* (2013.01); *H04B 17/318* (2015.01); *H04B 17/391* (2015.01); *H04W 84/18* (2013.01); *H04W 88/16* (2013.01)

(58) Field of Classification Search
CPC ..... H04W 64/00; H04W 84/18; H04W 88/16; H04W 4/029; H04W 4/33; H04W 4/80; H04W 4/90; H04W 4/02; H04W 4/023; H04B 17/318; H04L 12/2816;
(Continued)

(56) References Cited

U.S. PATENT DOCUMENTS

| | | | |
|---|---|---|---|
| 9,258,722 B2 * | 2/2016 | Schmidt | ................ H04W 24/02 |
| 9,332,304 B2 | 5/2016 | Ogle et al. | |

(Continued)

*Primary Examiner* — Khawar Iqbal
(74) *Attorney, Agent, or Firm* — Scott Griggs; Griggs Bergen LLP

(57) ABSTRACT

A geolocationing system and method for providing awareness in a multi-space environment, such as a hospitality environment or educational environment, are presented. In one embodiment of the geolocationing system, a vertical and horizontal array of gateway devices is provided. The vertical and horizontal array of gateway devices form a mesh network. Each gateway device includes a gateway device identification providing an accurately-known fixed location within the multi-space environment. Each gateway device includes a wireless transceiver that receives a beacon signal from a proximate wireless-enabled personal locator device. The gateway devices, in turn, send gateway signals via the mesh network to a server, which determines estimated location of the wireless-enabled personal location device with received signal characteristic modeling.

20 Claims, 6 Drawing Sheets

Related U.S. Application Data

16/733,041, filed on Jan. 2, 2020, now Pat. No. 10,904,582, which is a continuation-in-part of application No. 16/201,783, filed on Nov. 27, 2018, now Pat. No. 10,602,196, which is a continuation of application No. 15/652,622, filed on Jul. 18, 2017, now Pat. No. 10,142,662, which is a continuation of application No. 15/165,851, filed on May 26, 2016, now Pat. No. 9,712,872, which is a continuation of application No. 14/461,479, filed on Aug. 18, 2014, now Pat. No. 9,357,254.

(60) Provisional application No. 62/787,785, filed on Jan. 3, 2019, provisional application No. 61/935,862, filed on Feb. 5, 2014.

(51) Int. Cl.
*H04W 88/16* (2009.01)
*H04W 84/18* (2009.01)

(58) Field of Classification Search
CPC ............... H04L 12/40006; H04L 12/66; H04L 65/1023; H04L 65/4076; H04L 67/12; H04L 67/18
See application file for complete search history.

(56) References Cited

U.S. PATENT DOCUMENTS

| | | | |
|---|---|---|---|
| 9,344,757 B2 | 5/2016 | Ogle et al. | |
| 9,357,254 B2 | 5/2016 | Ogle et al. | |
| 9,537,216 B1* | 1/2017 | Kontopidis | H01Q 3/36 |
| 9,654,826 B2 | 5/2017 | Ogle et al. | |
| 9,654,827 B2 | 5/2017 | Ogle et al. | |
| 9,832,490 B2 | 11/2017 | Ogle et al. | |
| 11,812,303 B1* | 11/2023 | Tian | H04W 28/0231 |
| 2011/0099575 A1 | 4/2011 | Woo et al. | |
| 2015/0036482 A1* | 2/2015 | Schmidt | H04W 28/06 |
| | | | 370/221 |
| 2015/0221199 A1 | 8/2015 | Ogle et al. | |
| 2016/0127978 A1* | 5/2016 | Jing | H04W 40/248 |
| | | | 370/254 |
| 2016/0212729 A1* | 7/2016 | Bulten | H04W 72/51 |
| 2016/0277796 A1 | 9/2016 | Ogle et al. | |
| 2017/0251256 A1 | 8/2017 | Ogle et al. | |
| 2017/0366458 A1* | 12/2017 | Chan | H04L 45/745 |
| 2018/0331914 A1* | 11/2018 | Yoshida | H04W 76/14 |
| 2019/0120927 A1* | 4/2019 | Nishimura | G01S 5/02216 |
| 2019/0141484 A1* | 5/2019 | Singamsetty | H04W 4/029 |
| 2019/0394777 A1* | 12/2019 | Gunasekara | H04W 28/16 |
| 2020/0184811 A1* | 6/2020 | Rosales | G08G 1/096783 |
| 2020/0188718 A1* | 6/2020 | Trivelpiece | A62C 37/36 |
| 2020/0352008 A1* | 11/2020 | Chan | H05B 47/115 |
| 2021/0368469 A1 | 11/2021 | Fang et al. | |

\* cited by examiner

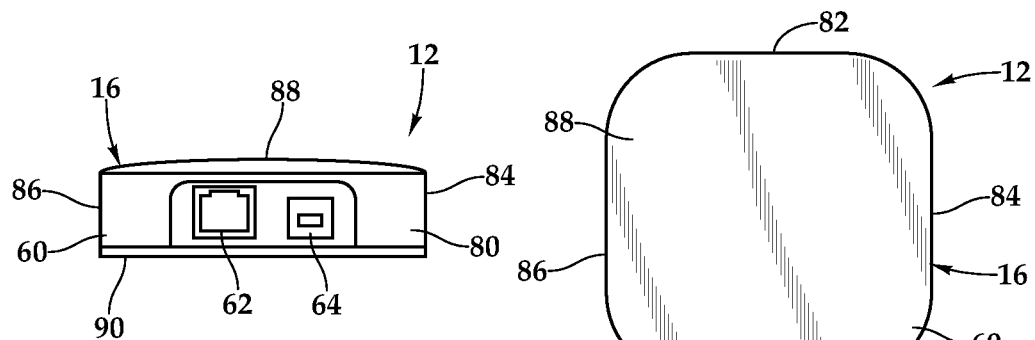
Fig.3A
Fig.3B
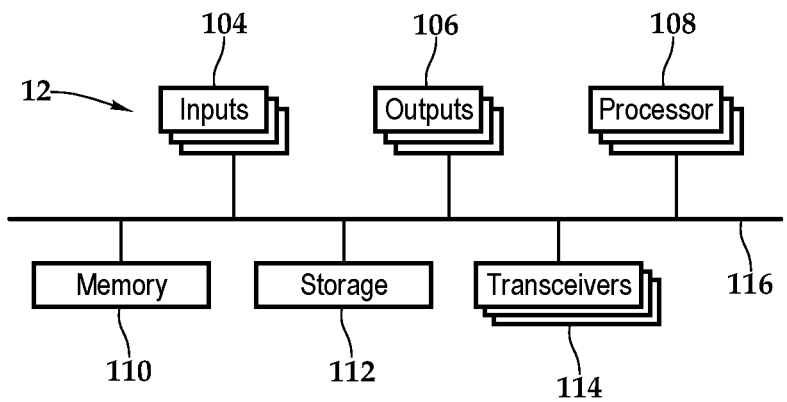
Fig.4
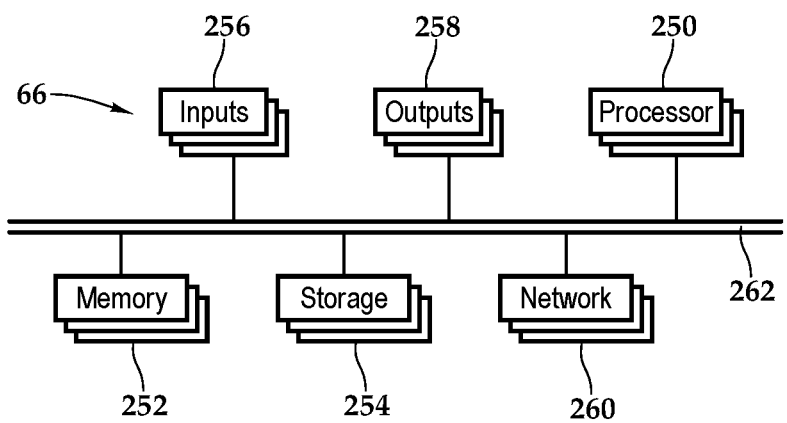
Fig.7

GEOLOCATIONING SYSTEM AND METHOD FOR USE OF SAME

PRIORITY STATEMENT & CROSS-REFERENCE TO RELATED APPLICATION

This application is a continuation of U.S. application Ser. No. 16/881,890 entitled "Geolocationing System and Method for Use of Same," filed on May 22, 2020 in the names of William C. Fang et al.; which is hereby incorporated by reference, in entirety, for all purposes.

This application is also a continuation-in-part of U.S. application Ser. No. 17/154,713 entitled "Geolocationing System and Method for Use of Same," filed on Jan. 21, 2021 in the names of William C. Fang, et al.; which is a continuation of U.S. application Ser. No. 16/733,041 entitled "Geolocationing System and Method for Use of Same," filed on Jan. 2, 2020 in the names of William C. Fang, et al., now U.S. Pat. No. 10,904,582 issued on Jan. 26, 2021; which claims priority from U.S. Patent Application Ser. No. 62/787,785 entitled "Geolocationing System and Method for Use of Same" filed on Jan. 3, 2019, in the name of William C. Fang; both of which are hereby incorporated by reference, in entirety, for all purposes. U.S. application Ser. No. 16/733,041 is also a continuation-in-part of U.S. patent application Ser. No. 16/201,783 entitled "Set-Top Box, System and Method for Providing Awareness in a Hospitality Environment" filed on Nov. 27, 2018, in the names of Vanessa Ogle et al.; which is a continuation of U.S. patent application Ser. No. 15/652,622 entitled "Set-Top Box, System and Method for Providing Awareness in a Hospitality Environment" filed on Jul. 18, 2017, in the names of Vanessa Ogle et al., now U.S. Pat. No. 10,142,662 issued on Nov. 27, 2018; which is a continuation of U.S. patent application Ser. No. 15/165,851 entitled "Set-Top Box, System and Method for Providing Awareness in a Hospitality Environment" filed on May 26, 2016, in the names of Vanessa Ogle et al., now U.S. Pat. No. 9,712,872 issued on Jul. 18, 2017; which is a continuation of U.S. patent application Ser. No. 14/461,479 entitled "Set-Top Box, System and Method for Providing Awareness in a Hospitality Environment" filed on Aug. 18, 2014, in the names of Vanessa Ogle et al., now U.S. Pat. No. 9,357,254 issued on May 31, 2016; which claims priority from U.S. Patent Application Ser. No. 61/935,862 entitled "System and Method for Providing Awareness in a Hospitality Environment" and filed on Feb. 5, 2014, in the name of Vanessa Ogle; all of which are hereby incorporated by reference, in entirety, for all purposes.

TECHNICAL FIELD OF THE INVENTION

This invention relates, in general, to geolocationing and, in particular, to enhanced performance in systems and methods for providing awareness and safety in a multi-room environment such as a hospitality environment, educational environment, or the like.

BACKGROUND OF THE INVENTION

Without limiting the scope of the present invention, the background will be described in relation to employee safety in hospitality environments, as an example. Employees face increased personal security risks at work in multi-room environments such as hospitality environments, which include motels, hotels, and the like, for example. Such hospitality industry employees often work alone and range over large interior areas that may be divided into many small, closed spaces. As a result of limited existing security measures, there is a need for improved systems and methods of providing awareness and safety in hospitality environments.

SUMMARY OF THE INVENTION

It would be advantageous to achieve systems and methods for providing geolocationing in a multi-room environment such as a hospitality environment, educational environment, or the like that would improve upon existing limitations in functionality. It would be desirable to enable an electrical engineering-based and software solution that would provide enhanced awareness and safety in an easy-to-use platform in the hospitality lodging industry or in another environment. To better address one or more of these concerns, a geolocationing system and method for use of the same are disclosed.

In one embodiment of the geolocationing system, a vertical and horizontal array of gateway devices is provided. The vertical and horizontal array of gateway devices form a mesh network. Each gateway device includes a gateway device identification providing an accurately-known fixed location within the multi-space environment. Each gateway device includes a wireless transceiver that receives a beacon signal from a proximate wireless-enabled personal location device. The gateway devices, in turn, send gateway signals via the mesh network to a server, which determine estimated location of the wireless-enabled personal location device with received signal characteristic modeling. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 3A is a front elevation view of one embodiment of a gateway device depicted in FIG. 1 in further detail;

FIG. 3B is a top plan view of the gateway device depicted in FIG. 3A;

FIG. 4 is a functional block diagram depicting one embodiment of the gateway device presented in FIGS. 3A and 3B;

FIG. 7 is a functional block diagram depicting one embodiment of the server presented in FIG. 2.

DETAILED DESCRIPTION OF THE INVENTION

Figure 1A:
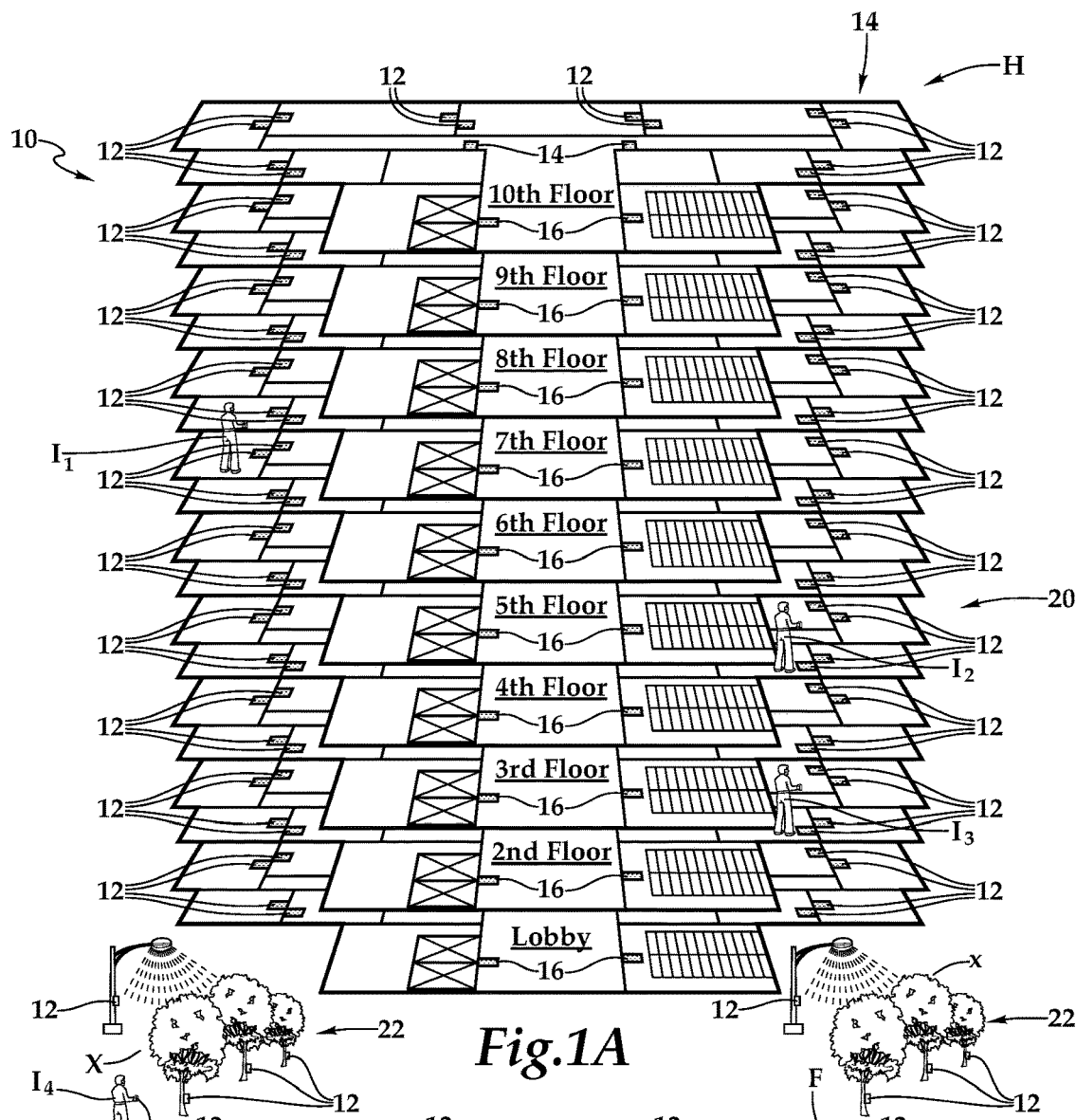
FIG. 1A is schematic building diagram depicting one embodiment of a geolocationing system for providing awareness in a multi-room environment illustrated as a hotel, according to the teachings presented herein.
Figure 1B:
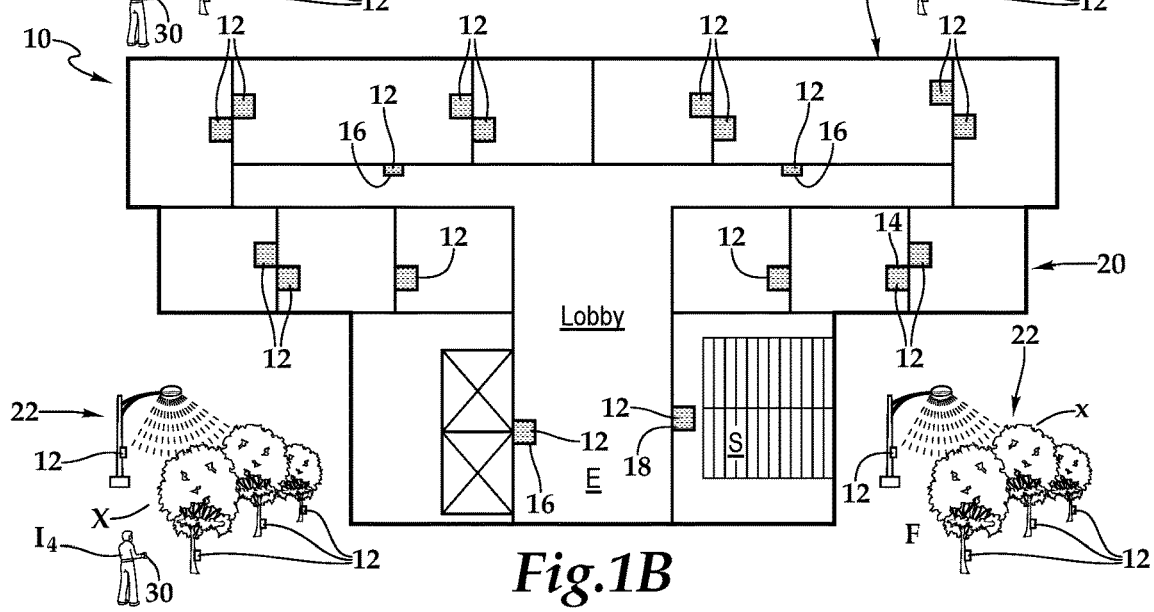
FIG. 1B is a schematic floor plan depicting a lobby and outdoor area of the hotel presented in FIG. 1A in further detail.

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Referring initially to FIGS. 1A, 1B, 2A, and 2B, therein is depicted a geolocationing system for providing awareness in a multi-space environment such as a hospitality environment, which may be as a furnished multi-family residence, dormitory, lodging establishment, hotel, hospital, which is schematically illustrated and designated 10. The multi-space environment may also be a multi-unit environment such as an educational environment like a school or college campus, for example. More generally, the geolocationing system 10 and the teachings presented herein are applicable to any multi-space environment including hospitality environments, educational campuses, hospital campuses, office buildings, multi-unit dwellings, sport facilities and shopping malls, for example. It should be appreciated that the multi-space environment may include inside and outside spaces as well.

As shown, by way of example and not by way of limitation, the multi-space environment is depicted as a hotel H having a lobby and floors F, which are appropriately labeled the $2^{nd}$ floor through the $10^{th}$ floor. Additionally, a common area near the elevators is labeled E, a hallway labeled P, and a stairwell is labeled S. The lobby, the common area E, the hallway P, and the stairwell S are further illustrations of spaces in the multi-space environment in addition to the rooms. Outside areas X are also further illustrations of spaces in the multi-space environment.

Gateway devices 12 are deployed as part of a horizontal and vertical array, which is generally a spatial array, throughout the hotel H. It should be appreciated, however, that the gateway devices 12 and more generally deployment of the geolocationing system 10 may include a horizontal array. Further, the deployment may be in a single story, multiple stories, or a combination thereof. As alluded previously, the deployment may include inside and outside spaces. As will be discussed in further detail hereinbelow, the gateway devices 12 may include set-top boxes 14, gateway service devices 16, or a common space gateway device 18. The gateway devices 12 define a network covered area 20 and a non-network covered area 22 that is outside of the network covered area 20, which is represented by a wired network, and connected thereto by a mesh network 24. The mesh network 24 may include a local topology in which the vertical and horizontal array of gateway devices 12 connect directly, dynamically and non-hierarchically to as many other gateway devices 12 as possible to cooperate with one another to efficiently route the gateway signal. The mesh network 24 may be a partially connected mesh network 26 or a fully connected mesh network 28.

Individuals, such as $I_1$, $I_2$, $I_3$, $I_4$ carry personal locator devices 30 which periodically, or on demand, transmit beacons that are received by a gateway device 12. The personal locator devices 30 may be a single button personal locator device 32 or a wireless-enabled interactive programmable device 34, such as a smart watch, a smart phone, or a tablet computer, for example. In one embodiment, the wireless-enabled interactive programmable device 34 may be a wireless-enabled smart and interactive handheld device that may be supplied or carried by the user or guest. As shown, individual 14 works in the hospitality industry at hotel H and is presently working outside in an outside area X. As the individual 14 is working in the outside area X, the personal locator device 30 is transmitting beacons that are received by gateway devices 12, which are part of the mesh network 24 located in the non-network covered area 22. The gateway devices 12 propagate gateway signals through the mesh network 24 to the network covered area 20, where the gateway signals are forwarded to the server 66.

Figure 2A:
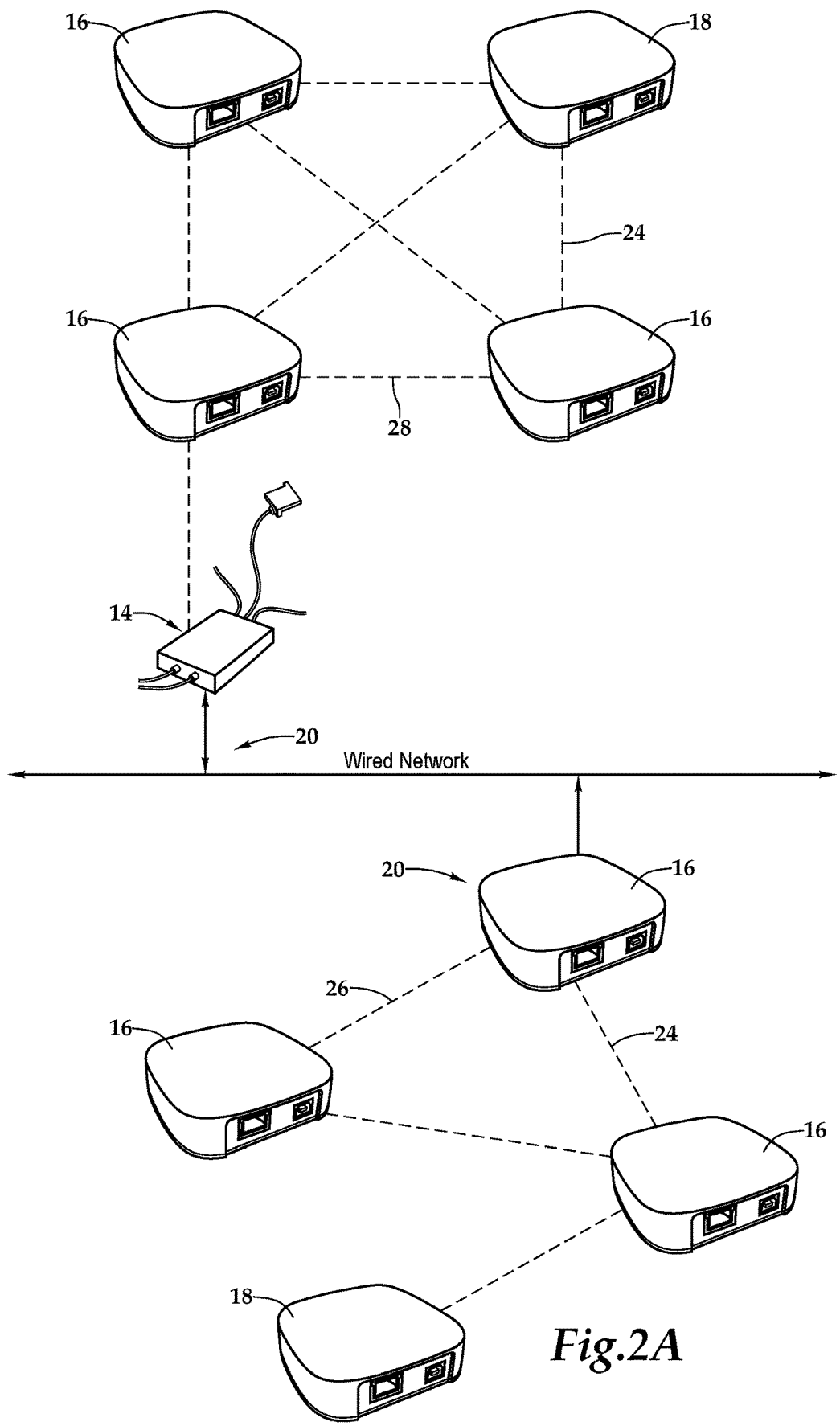
FIG. 2A is a schematic diagram depicting one embodiment of the geolocationing system presented in FIG. 1A at a topology level providing enhanced awareness and safety functionality therewith according to the teachings presented herein.
Figure 2B:
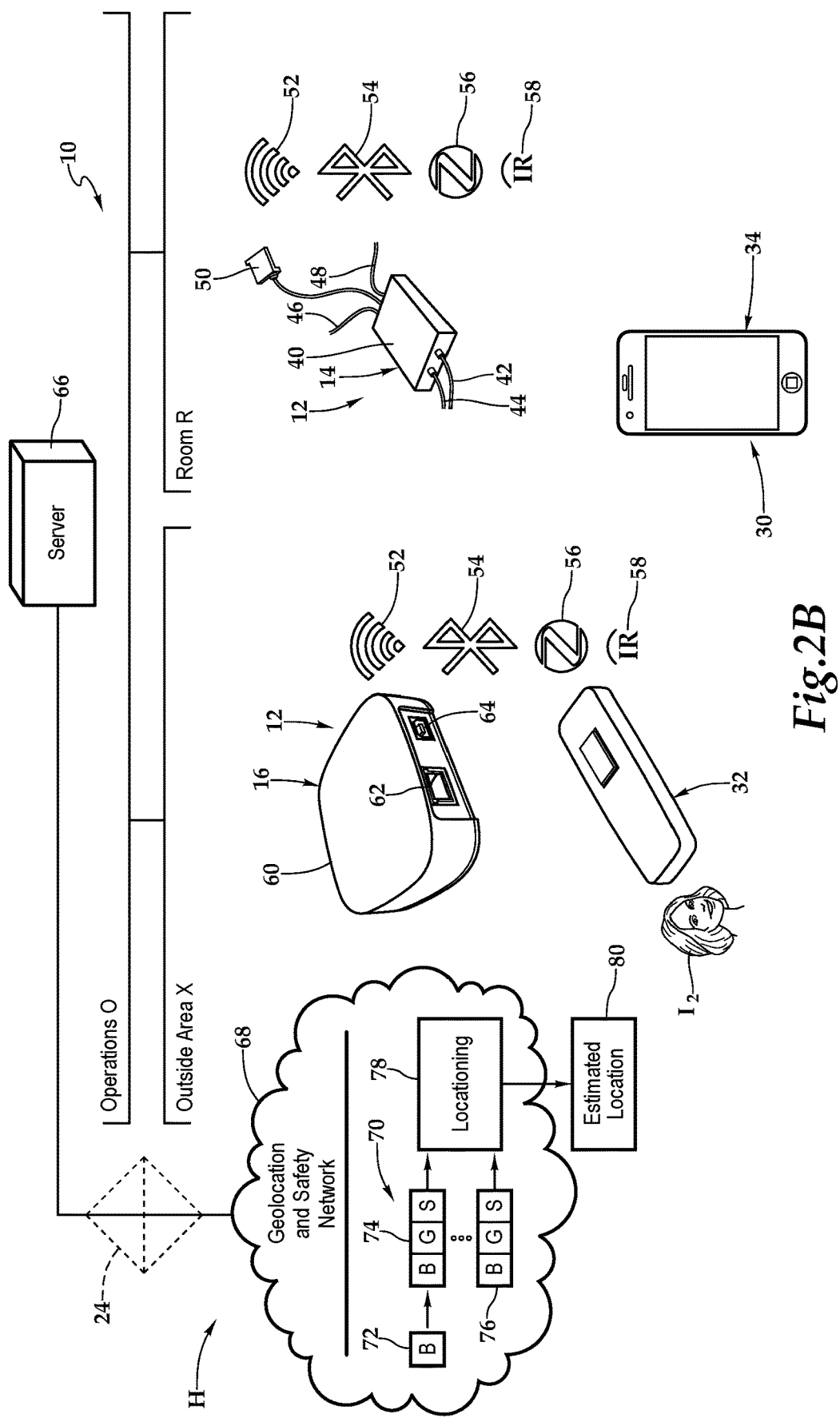
FIG. 2B is a schematic diagram depicting one embodiment of the geolocationing system presented in FIG. 1A at a network level providing enhanced awareness and safety functionality therewith according to the teachings presented herein.
Figure 5A:
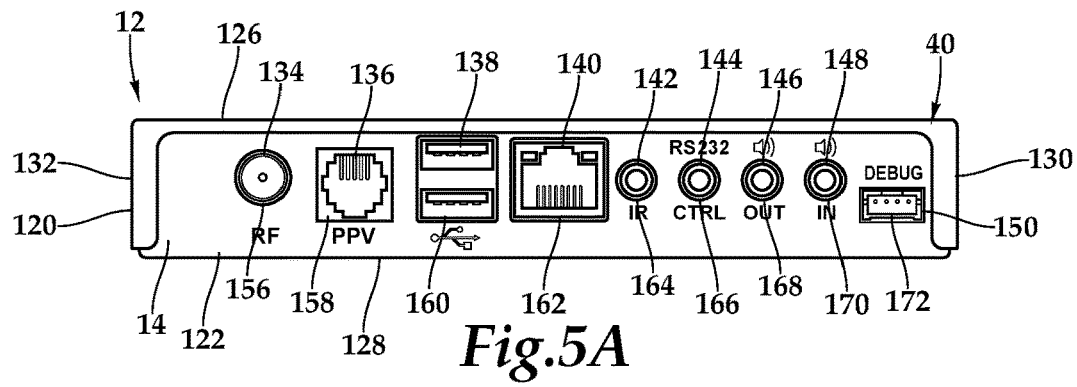
FIG. 5A is a wall-facing exterior elevation view of one embodiment of the set-top box depicted in FIG. 1 in further detail.
Figure 5B:
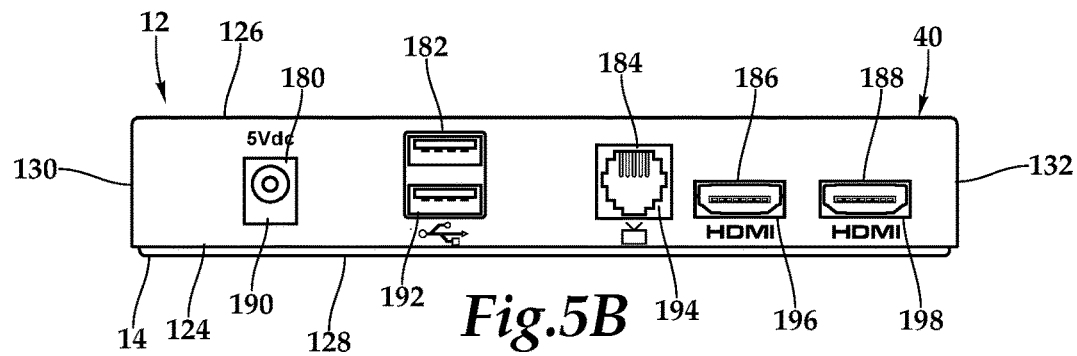
FIG. 5B is a display-facing exterior elevation view of the set-top box depicted in FIG. 1.
Figure 5C:
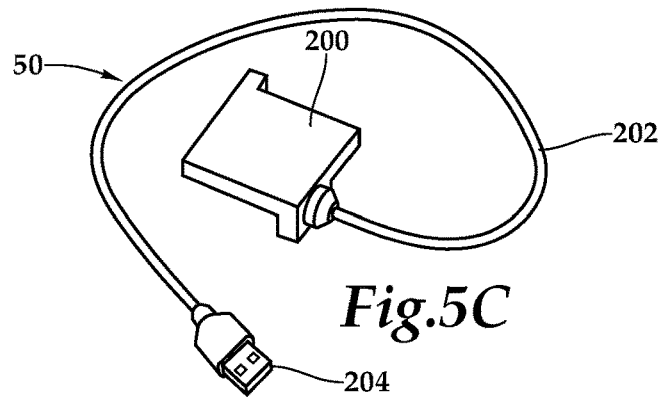
FIG. 5C is a front perspective view of a dongle depicted in FIG. 1 in further detail.
Figure 6:
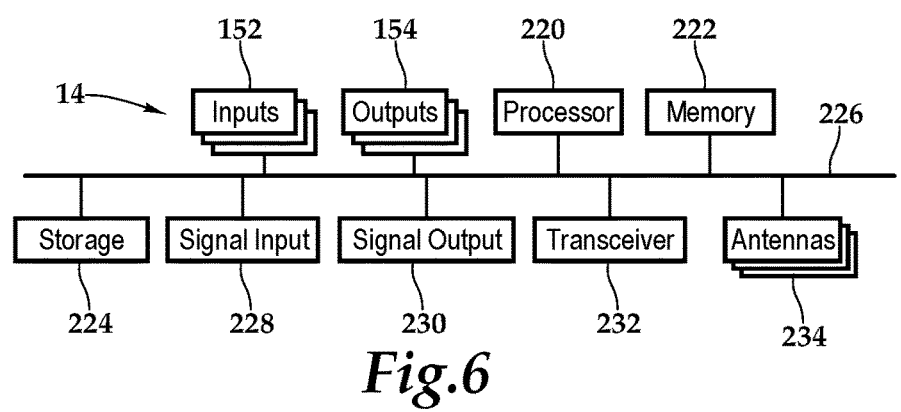
FIG. 6 is a functional block diagram depicting one embodiment of the set-top box presented in FIGS. 3A and 3B.

As shown, the gateway device 12 in the room R is a set-top box 14, which may be connected to an electronic visual display device such as a display or television. The set-top box 14 includes a housing 40 and a connection, which is depicted as an HDMI connection 42, connects the set-top box 14 to the display (not shown). Other connections include a power cable 44 coupling the set-top box 14 to a power source, a coaxial cable 46 coupling the set-top box 14 to an external cable source, and a category five (Cat 5) cable 48 coupling the set-top box 14 to an external pay-per-view source, for example. As shown, the set-top box 14 may include a dongle 50 providing particular technology and functionality extensions thereto. That is, the set-top box 14 may be set-top box-dongle combination in one embodiment. More generally, it should be appreciated that the cabling connected to the set-top box 14 will depend on the environment and application, and the cabling connections presented in FIG. 2B are depicted for illustrative purposes. Further, it should be appreciated that the positioning of the set-top box 14 will vary depending on environment and application and, with certain functionality, the set-top box 14 may be placed more discretely behind the display 14 or as an in-wall mount. At least one antenna associated with the set-top box 14 provides for the wireless capabilities of the gateway device 12 and include, for example, wireless standards: Wi-Fi 52, Bluetooth 54, ZigBee 56, infrared 58.

As mentioned, in one embodiment, the gateway device 12 in the outside space X of the non-network covered area 22 is a gateway service device 16 having a housing 60 with physical connection ports 62, 64. A network cable which may be a category five (Cat 5) cable, may be secured to physical connection port 62. Multiple antennas provide for the wireless capabilities of the gateway device 12 and include, for example, wireless standards: Wi-Fi 52, Bluetooth 54, ZigBee 56, and IR 58. The personal locator device 30, including each of the single button personal locator device 32 or the wireless-enabled interactive programmable device 34, may utilize any wireless standard, including the standards of Wi-Fi 52, Bluetooth 54, ZigBee 56, and IR 58. More generally, it should be appreciated that the cabling connected to the gateway device 12 and antenna configuration will depend on the environment and application and the cabling connections and wireless standards presented in FIG. 2B are depicted for illustrative purposes. Although not shown in FIG. 2B, the common space gateway device 18 may be similar in appearance to the gateway service device 16.

As shown, each of the gateway devices 12, including the set-top box 14 and the gateway service device 16 of FIG. 2B, have a data link to the server 66 which is providing a geolocation and safety network 68. In one implementation, an individual 12 has the personal location device, which may transmit a beacon from the personal location device 30 using a wireless standard such as Wi-Fi 52 to the gateway devices 12. Each of the gateway devices 12, including the set-top box 14 and the gateway service device 16, then processes the received beacon signal and sends a gateway signal to the server 66. More particularly, with respect to data flow 70, the personal locator device 30, which is the single button personal locator 32, transmits the beacon signal 72 which includes a personal location device identification identifying the personal locator device 30. The beacon signal 72 is received by each of the gateway devices 12 which transmit broadcast signals 74, 76 including the personal location device identification, a gateway device identification identifying the gateway device 12, and a signal characteristic indicator, such as signal strength, for example. The server 66 receives the broadcast signal 74 via the mesh network 24 and uses multiple broadcast signals, including the broadcast signals 74, 76, for locationing 78, for determining the estimated location 80 of the personal location device 30 of the individual 12. The server 66, in turn, sends out the appropriate notifications to various phones, activates alarms, or notify others via a computer, depending on the situation. As a spatial array of horizontal and vertical gateway devices 12 are provided, the server 66 and system 10 presented herein is able to determine the location of the individual associated with the personal location device 30 within a building. The estimated location 80 includes which floor the individual is presently located as well as the room or common area.

As will be appreciated, there are several methods for connecting vertical and horizontal array of gateway devices 12 to the server 66. Commonly used methods include Ethernet, Data Over Cable Service Interface Specification (DOCSIS), Multimedia over Coax (MoCa), and Wi-Fi. Frequently, however the desired coverage areas include non-network covered areas that lack the wired network or Wi-Fi connections, such as parking lots, parking garages, outdoor spaces, playgrounds, and ball fields, for example. Extending the network covered area to the non-network covered area is generally a costly option and it often involves substantial time. The teachings presented herein propose to utilize a self-contained mesh network connecting gateway devices 12 within the non-network covered area 22 to the network covered area 20.

Generally, the gateway devices 12 within the network covered area 20 are connected by a wired network such as Ethernet or DOCSKS. Using the mesh technology presented herein, the gateway devices 12 within the non-network covered area 22 are will be configured with a wireless interface. Working as a mesh routers, the gateway devices 12 within the non-network covered 22 area will form a self-contained mesh that can expand the network covered area into a non-network covered area 22. In this configuration, gateway devices 12 at the edge of the network covered area 20 may act as bridges and also connect to the gateway devices 12 in the non-network covered area 22 by way of the wireless interface being used by the mesh network 24.

Referring to FIG. 3A, FIG. 3B, and FIG. 4, the gateway device 12 may be a set-top unit that is an information appliance device that does not include television-tuner functionality and generally contains convenience and safety functionality. The gateway service device 16 includes the housing 60 having a front wall 82, a rear wall 84, a side wall 86, a side wall 88, a top wall 90, and a bottom base 92. It should be appreciated that front wall, rear wall, and side wall are relative terms used for descriptive purposes and the orientation and the nomenclature of the walls may vary depending on application. The front wall 82 includes various ports, including the ports 62, 64 that provide interfaces for various interfaces, including inputs 104 and outputs 106. In one implementation, as illustrated, the port 62 is an RJ45 port and port 64 is a USB2 port. It should be appreciated that the configuration of ports may vary with the gateway device depending on application and context.

Within the housing 60, a processor 108, memory 110, storage 112, the inputs 104, and the outputs 106 are interconnected by a bus architecture 116 within a mounting architecture. The processor 108 may process instructions for execution within the computing device, including instructions stored in the memory 110 or in storage 112. The memory 110 stores information within the computing device. In one implementation, the memory 110 is a volatile memory unit or units. In another implementation, the memory 110 is a non-volatile memory unit or units. Storage 112 provides capacity that is capable of providing mass storage for the gateway device 12. Various inputs 104 and outputs 106 provide connections to and from the computing device, wherein the inputs 104 are the signals or data received by the gateway device 12, and the outputs 106 are the signals or data sent from the gateway device 12.

Multiple transceivers 114 are associated with the gateway device 12 and communicatively disposed with the bus 116. As shown the transceivers 114 may be internal, external, or a combination thereof to the housing. Further, the transceivers 114 may be a transmitter/receiver, receiver, an antenna, multiple transmitters/receivers, multiple receivers, or multiple antennas, for example. Communication between various amenities in the hotel room and the gateway device 12 may be enabled by a variety of wireless methodologies employed by the transceivers 114, including 802.11, 802.15, 802.15.4, 3G, 4G, Edge, Wi-Fi, ZigBee, near field communications (NFC), Bluetooth low energy and Bluetooth, for example. Also, infrared (IR) may be utilized.

The memory 110 and storage 112 are accessible to the processor 108 and include processor-executable instructions that, when executed, cause the processor 108 to execute a series of operations. With respect to the processor-executable instructions, the processor 108 is caused to receive and process a beacon signal including a personal location device identification. More particularly, the processor-executable instructions cause the processor 108 to receive a beacon signal via the wireless transceiver from a proximate wireless-enabled personal locator device. The processor-executable instructions then cause the processor 108 to measure a signal characteristic of the beacon signal. The instructions may then cause the processor 108 to generate a gateway signal including the personal location device identification, a gateway device identification, and signal characteristics indicator, including received signal strength, for example. Finally, the instructions may cause the processor 108 to send the gateway signal to the server 66. The processor 108 may be caused to transmit the gateway signal to the server 66 via the mesh network 24.

Referring to FIG. 5A, FIG. 5B, FIG. 5C, and FIG. 6, as used herein, set-top boxes, back boxes and set-top/back boxes may be discussed as set-top boxes. By way of example, the set-top box 14 may be a set-top unit that is an information appliance device that generally contains set-top box functionality including having a television-tuner input and displays output through a connection to a display or television set and an external source of signal, turning by way of tuning the source signal into content in a form that can then be displayed on the television screen or other display device. Such set-top boxes are used in cable television, satellite television, and over-the-air television systems, for example.

The set-top box 14 includes a housing 40 including a panel 120 and a rear wall 122, front wall 124, top wall 126, bottom base 128, and two sidewalls 130, 132. It should be appreciated that front wall, rear wall, and side wall are relative terms used for descriptive purposes and the orientation and the nomenclature of the walls may vary depending on application. The front wall includes various ports, ports 134, 136, 138, 140, 142, 144, 146, 148 and 150 that provide interfaces for various interfaces, including inputs 152 and outputs 154. In one implementation, as illustrated, the ports 134 through 150 include inputs 152 and outputs 154 and, more particularly, an RF input 156, a RJ-45 input 158, universal serial bus (USB) input/outputs 160, an Ethernet category 5 (Cat 5) coupling 162, an internal reset 164, an RS232 control 166, an audio out 168, an audio in 170, and a debug/maintenance port 172. The front wall 124 also includes various inputs 152 and outputs 154. More particularly, ports 180, 182, 184, 186, 188 include a 5V dc power connection 190, USB inputs/outputs 192, an RJ-45 coupling 194, an HDMI port 196 and an HDMI port 198. It should be appreciated that the configuration of ports may vary with the set-top box 14 depending on application and context. As previously alluded to, the housing 40 may include a housing-dongle combination including, with respect to the dongle 50, a unit 200 having a cable 202 with a set-top box connector 204 for selectively coupling with the set-top box 14.

Within the housing 40, a processor 220, memory 222, storage 224, the inputs 152, and the outputs 154 are interconnected by a bus architecture 226 within a mounting architecture. It should be understood that the processor 220, the memory 222, the storage 224, the inputs 152, and the outputs 154 may be entirely contained within the housing 40 or the housing-dongle combination. The processor 220 may process instructions for execution within the computing device, including instructions stored in the memory 222 or in storage 224. The memory 222 stores information within the computing device. In one implementation, the memory 222 is a volatile memory unit or units. In another implementation, the memory 222 is a non-volatile memory unit or units. Storage 224 provides capacity that is capable of providing mass storage for the set-top box 12. Various inputs 152 and outputs 154 provide connections to and from the computing device, wherein the inputs 152 are the signals or data received by the set-top box 14, and the outputs 154 are the signals or data sent from the set-top box 14. A television content signal input 228 and a television output 230 are also secured in the housing 40 in order to receive content from a source and forward the content, including external content such as cable and satellite and pay-per-view (PPV) programing, to the display.

A transceiver 232 is associated with the set-top box 14 and communicatively disposed with the bus 226. As shown the transceiver 232 may be internal, external, or a combination thereof to the housing 40. Further, the transceiver 232 may be a transmitter/receiver, receiver, or an antenna for example. Communication between various devices and the set-top box 14 may be enabled by a variety of wireless methodologies employed by the transceiver 232, including 802.11, 3G, 4G, Edge, WiFi, ZigBee, near field communications (NFC), Bluetooth low energy and Bluetooth, for example. Also, infrared (IR) may be utilized.

One or more wireless communication antennas 234 are associated with the set-top box 14 and communicatively disposed with the bus 226. As shown the wireless communication antennas 234 may be internal, external, or a combination thereof to the housing 40. Further, the wireless communication antennas 234 may be a transmitter/receiver, receiver, or an antenna for example. Communication from the set-top box 14 to one or more of the personal locator devices 30 may be enabled by a variety of wireless methodologies employed by the wireless communication antennas 234, including 802.11, 3G, 4G, Edge, WiFi, ZigBee, near field communications (NFC), Bluetooth low energy and Bluetooth, for example. Also, infrared (IR) may be utilized. In one implementation, the one or more wireless communication antennas 234 utilize a network connection protocol such as Bluetooth and the one or more wireless communication antennas 234 are Bluetooth transmitters.

The memory 222 and storage 224 are accessible to the processor 220 and include processor-executable instructions that, when executed, cause the processor 220 to execute a series of operations. With respect to the processor-executable instructions, the processor is caused to receive and process a beacon signal including a personal location device identification. More particularly, the processor-executable instructions cause the processor 220 to receive a beacon signal via the wireless transceiver from a proximate wireless-enabled personal locator device. The processor-executable instructions then cause the processor 220 to measure received signal strength of the beacon signal. The instructions may then cause the processor 220 to generate a gateway signal including the personal location device identification, a gateway device identification, and signal characteristics indicator, including received signal strength. Finally, the instructions may cause the processor 220 to send the gateway signal to the server 66. The processor 220 may be caused to transmit the gateway signal to the server 66 via the mesh network 24.

Referring now to FIG. 7, one embodiment of the server 66 as a computing device includes a processor 250, memory 252, storage 254, inputs 256, outputs 258, and network adaptors 260 interconnected with various buses 262 in a common or distributed, for example, mounting architecture. In other implementations, in the computing device, multiple processors and/or multiple buses may be used, as appropriate, along with multiple memories and types of memory. Further still, in other implementations, multiple computing devices may be provided and operations distributed therebetween. The processor 250 may process instructions for execution within the server 66, including instructions stored in the memory 252 or in storage 254. The memory 252 stores information within the computing device. In one implementation, the memory 252 is a volatile memory unit or units. In another implementation, the memory 252 is a non-volatile memory unit or units. Storage 254 includes capacity that is capable of providing mass storage for the server 66. Various inputs 256 and outputs 258 provide connections to and from the server 66, wherein the inputs 256 are the signals or data received by the server 66, and the outputs 268 are the signals or data sent from the server 66. The network adaptors 260 couple the server 66 to a network such that the server 66 may be part of a network of computers, a local area network (LAN), a wide area network (WAN), an intranet, a network of networks, or the Internet, for example.

The memory 252 and storage 254 are accessible to the processor 250 and include processor-executable instructions that, when executed, cause the processor 250 to execute a series of operations. In one embodiment of first processor-executable instructions, the processor-executable instructions cause the processor 250 to receive gateway signals from multiple gateway devices of the array, which may the vertical and horizontal array or only a horizontal array. The processor 250 is caused to process the plurality of gateway signals and determine estimated location of the proximate wireless-enabled personal location device.

Figure 8:
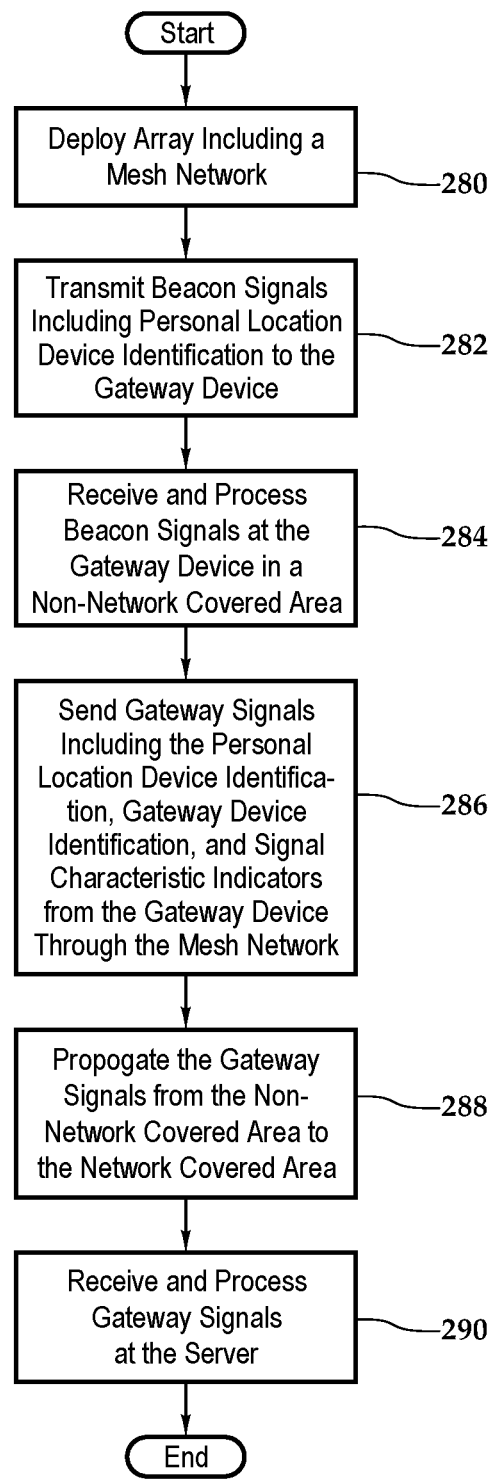
FIG. 8 is a flow chart depicting one embodiment of a method for providing a gateway device furnishing enhanced safety according to the teachings presented herein.

FIG. 8 depicts one embodiment of a method for providing safety in a hospitality environment or other environment, according to the teachings presented herein. At block 280, the array of gateway devices is deployed vertically and horizontally throughout the hospitality environment. The array of gateway devices includes a network covered area in communication with a non-network covered area. The gateway devices in the non-network covered area form a mesh network. At block 282, beacon signals are periodically transmitted from personal location devices and received by the gateway devices in a non-network covered area.

At block 284, the beacon signals are received and processed at the gateway device. The beacon signals may include a personal location device identification corresponding to the device being employed by the user. In one embodiment, a signal characteristic is measured. At block 286, gateway signals are sent from the gateway devices through the mesh network that is part of the geolocation and safety network. The gateway signals may include the personal location device identification, gateway device identification, and signal characteristic indicators. At block 288, the gateway signals are propagated from the non-network covered area to the network covered area. At block 290, the server receives and processes the broadcast signals.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for providing awareness in a multi-space environment, the system comprising:
a vertical and horizontal array of gateway devices, each gateway device being positioned within a space in the multi-space environment, each gateway device having a gateway device identification providing an accurately-known fixed location;
the vertical and horizontal array of gateway devices forming a mesh network, the mesh network further comprises a local topology in which the vertical and horizontal array of gateway devices connect directly, dynamically and non-hierarchically to as many other gateway devices as possible to cooperate with one another to efficiently route the gateway signal, the mesh network being outside of a network covered area and connected thereto in order to spatially extend network coverage at the multi-space environment, the network covered area being in communication with a server;
each gateway device of the vertical and horizontal array including:
a housing,
a wireless transceiver associated with the housing,
a processor located within the housing and coupled to the wireless transceiver, and
a memory accessible to the processor, the memory including processor-executable instructions that, when executed, cause the processor to:
receive a beacon signal via the wireless transceiver from a proximate wireless-enabled personal locator device, the beacon signal including a personal locator device identification,
measure received signal characteristic of the beacon signal,
transmit a gateway signal to the network covered area in communication with the server via the mesh network, the gateway signal including the personal locator device identification, the gateway device identification, and the received signal characteristic; and
the server located within the multi-space environment and in communication with the vertical and horizontal array of gateway devices by way of the network covered area, the server including:
a processor, and
a memory accessible to the processor, the memory including processor-executable instructions that, when executed, cause the processor to:
receive by way of the network covered area a plurality of gateway signals from a plurality of gateway devices of the vertical and horizontal array,
process the plurality of gateway signals with signal strength modeling, and
determine estimated location of the proximate wireless-enabled personal location device.

2. The system as recited in claim 1, wherein the mesh network further comprises a partially connected mesh network.

3. The system as recited in claim 1, wherein the mesh network further comprises a fully connected mesh network.

4. The system as recited in claim 1, wherein the wireless transceiver is configured to communicate with a standard selected from the group consisting of infrared (IR), 802.11, 3G, 4G, Edge, Wi-Fi, ZigBee, near field communications (NFC), Bluetooth and Bluetooth low energy.

5. The system as recited in claim 1, wherein the gateway device further comprises a plurality of wireless transceivers.

6. The system as recited in claim 1, wherein the gateway device further comprises a device selected from the group consisting of set-top boxes, common space gateway devices, and gateway service devices.

7. The system as recited in claim 1, wherein the proximate wireless-enabled personal locator device further comprises a device selected from the group consisting of single button personal locator devices and wireless-enabled interactive programmable devices.

8. The system as recited in claim 7, wherein the wireless-enabled interactive programmable device further comprises a device selected from the group consisting of smart watches, smart phones, and tablet computers.

9. The system as recited in claim 1, wherein the server further comprises a back-office hotel server in communication with the vertical and horizontal array of set-top boxes.

10. The system as recited in claim 1, wherein the processor-executable instructions that, when executed, cause the processor to process the plurality of gateway signals with trilateration and signal modeling strength further comprise processor-executable instructions that, when executed cause the processor to:
utilize at least three distances between at least three gateway signals from respective gateway devices to determine a point of intersection therebetween.

11. The system as recited claim 1, wherein the system further comprises an operational mode selected from the group consisting of alerts-enabled, service request-enabled, tracking-enabled, and non-tracking-enabled.

12. The system as recited in claim 1, wherein in the alerts-enabled mode, the server receives a distress signal from the proximate wireless-enabled personal locator device.

13. The system as recited in claim 1, wherein in the service-request-enabled mode, the server receives a service request from the proximate wireless-enabled personal locator device.

14. The system as recited in claim 1, wherein in the tracking-enabled mode, the server maintains in memory a plurality of estimated locations with timestamps associated with the proximate wireless-enabled personal locator device.

15. The system as recited in claim 1, wherein in the non-tracking-enabled mode, the server maintains in memory only the last known locations with timestamps associated with the proximate wireless-enabled personal locator device.

16. A system for providing awareness in a multi-space environment, the system comprising:
a vertical and horizontal array of gateway devices, each gateway device being positioned within a space in the multi-space environment, each gateway device having a gateway device identification providing an accurately-known fixed location;
the vertical and horizontal array of gateway devices forming a mesh network, the mesh network further comprises a local topology in which the vertical and horizontal array of gateway devices connect directly, dynamically and non-hierarchically to as many other gateway devices as possible to cooperate with one another to efficiently route the gateway signal, the mesh network being outside of a network covered area and connected thereto in order to spatially extend network coverage at the multi-space environment, the network covered area being in communication with a server; and
each gateway device of the vertical and horizontal array including:
a housing,
a wireless transceiver associated with the housing,
a processor located within the housing and coupled to the wireless transceiver, and
a memory accessible to the processor, the memory including processor-executable instructions that, when executed, cause the processor to:
receive a beacon signal via the wireless transceiver from a proximate wireless-enabled personal locator device, the beacon signal including a personal locator device identification,
measure received signal characteristic of the beacon signal, and
transmit a gateway signal to the network covered area in communication with the server via the mesh network, the gateway signal including the personal locator device identification, the gateway device identification, and the received signal characteristic.

17. The system as recited in claim 16, wherein the mesh network further comprises a local topology in which the vertical and horizontal array of gateway devices connect directly, dynamically and non-hierarchically to as many other gateway devices as possible to cooperate with one another to efficiently route the gateway signal.

18. A system for providing awareness in a multi-space environment, the system comprising:
a vertical and horizontal array of gateway devices, each gateway device being positioned within a space in the multi-space environment, each gateway device having a gateway device identification providing an accurately-known fixed location;
the vertical and horizontal array of gateway devices forming a mesh network;
each gateway device of the vertical and horizontal array including:
a housing,
a wireless transceiver associated with the housing,
a processor located within the housing and coupled to the wireless transceiver, and
a memory accessible to the processor, the memory including processor-executable instructions that, when executed, cause the processor to:
receive a beacon signal via the wireless transceiver from a proximate wireless-enabled personal locator device, the beacon signal including a personal locator device identification,
measure received signal characteristic of the beacon signal,
transmit a gateway signal to a server via the mesh network, the gateway signal including the personal locator device identification, the gateway device identification, and the received signal characteristic; and
the server located within the multi-space environment and in communication with the vertical and horizontal array of gateway devices, the server including:
a processor, and
a memory accessible to the processor, the memory including processor-executable instructions that, when executed, cause the processor to:
receive a plurality of gateway signals from a plurality of gateway devices of the vertical and horizontal array,
process the plurality of gateway signals with signal strength modeling, and
determine estimated location of the proximate wireless-enabled personal location device.

19. The system as recited in claim 18, wherein the mesh network further comprises a partially connected mesh network.

20. The system as recited in claim 18, wherein the mesh network further comprises a fully connected mesh network.

\* \* \* \* \*